July 28, 1964

J. J. DIETZ 3,142,758

ULTRAVIOLET DETECTOR DISCHARGE TUBE AND
THERMAL RELAY CIRCUIT

Filed Feb. 1, 1961

INVENTOR.
JOHN J. DIETZ

BY George H. Fritzinger

AGENT

United States Patent Office 3,142,758
Patented July 28, 1964

3,142,758
ULTRAVIOLET DETECTOR DISCHARGE TUBE
AND THERMAL RELAY CIRCUIT
John J. Dietz, Cedar Grove, N.J., assignor to McGraw-
Edison Company, Elgin, Ill., a corporation of Delaware
Filed Feb. 1, 1961, Ser. No. 86,341
3 Claims. (Cl. 250—83.3)

This invention relates to detector systems which are responsive to ultraviolet light and which utilize ultraviolet detector tubes of the type described in the pending Howling application Serial No. 801,625, filed March 24, 1959, now U.S. Patent No. 3,047,761, dated July 31, 1962. More particularly, the invention relates to a new combination of such ultraviolet detector tube and utilization circuit therefor.

In the preferred form of the above detector tube the same is provided with symmetrical electrodes rendering the tube capable of passing alternating current when the tube is subjected to an alternating current firing voltage and to incident photon radiation, the term "firing voltage" being herein used to mean a voltage sufficient to cause the tube to undergo a glow discharge when excited by an incident photon. The electrodes of the tube are characterized as being free of sharp edges, projections and other discontinuities as well as of contaminants throughout the working region wherein an emitted electron responsive to an incident photon is capable of triggering a glow discharge between the electrodes. By these refinements the electrodes are caused to have a uniformly high work function throughout the working region which renders the tubes solar blind but responsive with high sensitivity to ultraviolet radiation.

An object of the invention is to provide a very simple and economical work circuit for the above described type of ultraviolet detector tube.

Other objects are to provide an improved ultraviolet detector system which employs a minimum number of circuit elements and which is characterized as having a high sensitivity and an inherent time delay rendering the system unresponsive to random photon excitations.

Another object is to provide a simple utilization circuit for the aforesaid ultraviolet detector tube, which employs a thermal relay responsive to the R.M.S. value of the current flow through the tube when the tube is excited.

Another object is to provide a novel monitoring system comprising a closely coupled transformer having an ultraviolet tube connected in the secondary circuit and a relay of the thermal or electromagnetic type connected in the primary circuit.

These and other objects and features of the invention will be apparent from the following description and the appended claims.

In the description of the invention reference is had to the accompanying drawings, of which:

Figure 1:
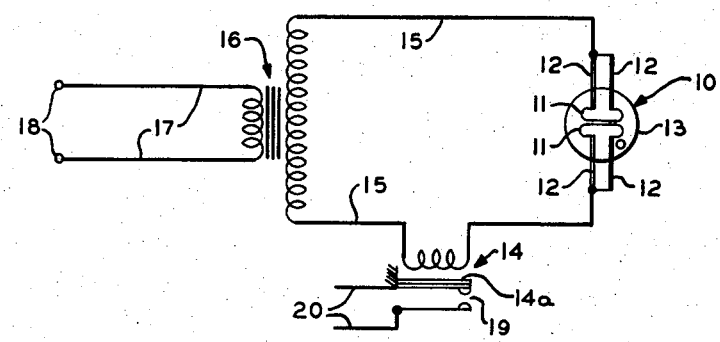
FIGURE 1 is a circuit diagram illustrating one embodiment of the invention.

The ultraviolet tube 10 shown in the figures comprises two identical electrodes 11 preferably of tungsten wires having semicircular end portions and intermediate rectilinear portions of which the end portions are directed away from each other and welded to support pins 12 to hold the intermediate rectilinear portions in parallel juxtaposition to each other. The support pins and electrode wires may for example have .050″ and .017″ diameter respectively, and the spacing between the parallel portions may be .040″. The support pins 12 are brought through graded glass seals in the base of an envelope 13 made of an ultraviolet transmitting glass such for example as Corning glass No. 9741 of the borosilicate family. The tube is pumped to a high vacuum under baking and is then filled with pure hydrogen to a striking voltage under ultraviolet excitation of about 700 volts D.C.

The electrodes are electropolished and refined as described in the above Howling application so that they have ultrasmooth surfaces free of edges, projections and discontinuities as well as of any contaminants throughout the central region of the tube encompassing the parallel and half-circle end portions of the tungsten wire electrodes. A result of these refining operations in constructing the ultraviolet tube is to confine all discharges to one central working region and to cause all of the elemental surface areas of the electrodes within this working region to have a uniformly high work function giving the tube a stable spectral response sensitive only to wave lengths below about 2800 to 3000 Angstrom units. The tube is therefore rendered highly responsive to ultraviolet radiation but is unresponsive to sunlight in the normal atmosphere.

It has heretofore been the practise to connect the ultraviolet tube in series with a condenser and through a rectifier to a D.C. relay shunted by a condenser for filter and time delay purposes. In such arrangement the D.C. relay responds to the average current flow through the ultraviolet tube. In accordance with the invention, the need for series and shunt condensers as well as for rectifying means are eliminated by using the ultraviolet tube in conjunction with a thermal relay. For example, in the embodiment of the invention shown in FIGURE 1, the ultraviolet tube 10 is connected serially with the heater winding of a thermal relay 14 in a secondary circuit 15 of a voltage step-up transformer 16 having its primary circuit 17 connected at 18 to a source of A.C. voltage such as a 60 cycle 110 volt power line. The relay 14 has a thermally responsive element or bimetal 14a controlling a pair of switch contacts 19 connected in a control circuit 20. In this circuit arrangement the thermal relay responds to the R.M.S. value of the current flow through the ultraviolet tube instead of to the average value to provide a higher sensitivity of operation. Furthermore, the thermal relay requires no separate circuit components for rectifying, filtering or time delay purposes since all of these functions are accomplished inherently in the action of the thermal relay itself. The thermal relay therefore responds evenly and with inherent time delay to A.C. current flow through the ultraviolet tube when the tube is excited by incident photons. Preferably, an inherent time delay in the relay of the order of two to three seconds is desirable so that the relay will not operate responsive to single or occasional random excitations.

Since the secondary circuit 15 is a high voltage one it is required that the winding of the relay 15 have a high impedance of the order of 10,000 ohms when the relay is connected directly in series with the ultraviolet tube as shown in the embodiment of FIGURE 1. However, in the modified form of the invention shown in FIGURE 2 the relay designated as 21 is connected serially in the low impedance primary circuit 17 with the result that the need for a high impedance winding is eliminated. The secondary circuit includes only the ultraviolet tube 10 and a current limiting resistor 22 of the order of about 3000 ohms. The winding 21w of the relay may now be of the order of only 300 ohms—a value which is economical to produce. Moreover, by suitable selection of the winding resistance of the relay in the primary circuit the need for a suitable current limiting resistor 22 in the secondary circuit may be eliminated. The ultraviolet detector system is therefore reduced to its barest essential elements. It is important however in this embodiment that the transformer 16 be closely coupled so that the current flow through the relay winding is small when the ultraviolet tube is in a non-conductive state. However, the effect of any such loss current in the primary circuit can be compensated for by providing the relay 21 with a compensating bimetal 21b carrying the second of the switch contacts and connecting a heater winding 23 for the compensating bimetal 21b across the voltage source 18 through an adjustable resistor 24 as shown in the modified embodiment of FIGURE 3.

Figure 2:
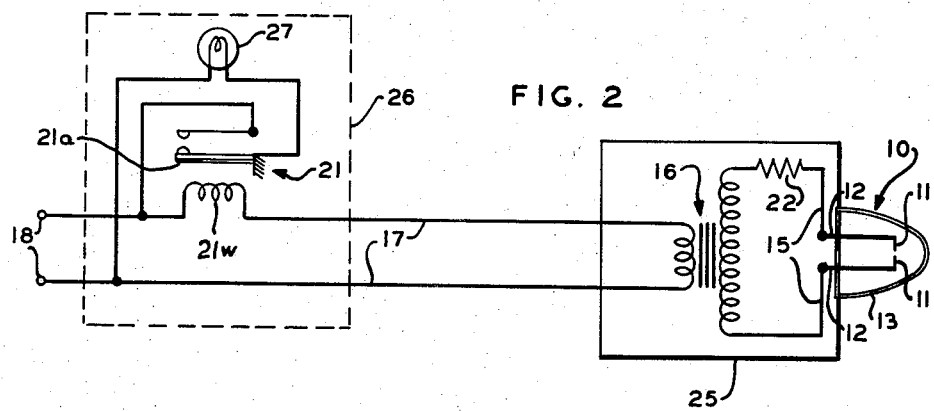
FIGURE 2 is a circuit diagram showing a preferred form of monitoring system according to the invention.
Figure 3:
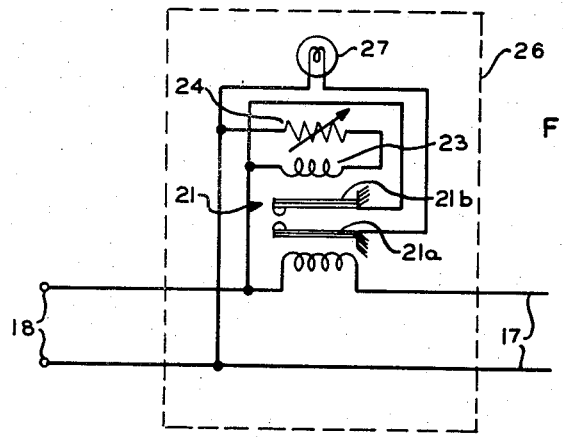
FIGURE 3 is a fractional circuit diagram illustrating a modification of the circuit diagram shown in FIGURE 2.

The advantages of using a thermal relay described above with respect to the embodiment of FIGURE 1 are also realized when the relay is connected in the primary circuit as shown in the embodiment of FIGURE 2. The placing of the relay in the primary circuit produces however further advantages arising from a more favorable physical disposition of the components, which is achieved whether or not the relay is of the thermal or electromagnetic type. For example, in the monitoring system depicted in FIGURE 2 the step-up transformer 16 and the ultraviolet tube 10 is arranged as a probe unit wherein the transformer is mounted in a protective container 25 and the ultraviolet tube 10 is mounted on one end wall of this container. This probe unit is located at any remote station to be monitored for presence of fire. The relay 21 is then located at a control station 26 having a signalling means such as a lamp 27 connected across the power source 18 through the contacts of the relay. By this arrangement there is need for only two wires between the two stations constituting the low impedance primary circuit 17.

The embodiments of my invention herein particularly shown and described are intended to be illustrative and not necessarily limitative of my invention, since the same is subject to changes and modifications without departure from the scope of my invention, which I endeavor to express according to the following claims.

I claim:

1. An ultraviolet detecting system comprising an ultraviolet detector tube having electrodes adapted to pass a pulsating discharge current when subjected to an applied pulsating potential and excited by incident photons, circuit means for providing a pulsating firing voltage capable of producing a pulsating glow discharge in said ultraviolet tube when the tube is excited by incident photons, and a thermal relay having a heater winding connected in said circuit means to cause the relay to be operated when said ultraviolet tube is undergoing discharge.

2. An ultraviolet detecting system comprising an ultraviolet detector tube having electrodes adapted to pass a pulsating discharge current when subjected to an applied pulsating potential and excited by incident photons, a closely coupled voltage step-up transformer having a primary winding to be connected to a source of A.C. potential and a secondary winding connected to said ultraviolet tube for providing a pulsating firing voltage capable of producing a pulsating glow discharge in said tube when the tube is excited by incident photons, said detector tube and transformer being located at a station to be monitored for presence of ultraviolet radiation, and utilization circuit means at a control station remote from said monitored station and connected in the primary circuit of said transformer, said utilization circuit means including a relay operated in response to the increase in the current flow in said primary circuit when said ultraviolet tube is excited into a discharge.

3. An ultraviolet detecting system comprising a probe unit at a station to be monitored for presence of ultraviolet radiation and a control unit at a station remote from said monitored station, said probe unit including an ultraviolet detector tube having electrodes with portions in an adjacent relationship forming a working region wherein the emission of electrons responsive to incident ultraviolet radiation are effective to trigger an avalanche discharge when a firing potential is applied across the electrodes, a step-up transformer having a low voltage primary winding to be connected to a power line and having a high voltage secondary winding connected to said detector tube for supplying a pulsating firing voltage across the electrodes of said tube, a housing for said transformer, and means mounting said detector tube on said housing with the tube exposed to intercept ultraviolet radiation at said monitored station; and said control unit comprising a low voltage circuit running from said control station to said monitored station and connected to the primary winding of said transformer of said probe unit, and a utilization circuit means connected to said low voltage circuit, said transformer being closely coupled to cause said utilization circuit means to respond to the change in current flow in said secondary winding when said detector tube is triggered into a discharge.

References Cited in the file of this patent

UNITED STATES PATENTS

| | | |
|---|---|---|
| 1,837,364 | Ives | Dec. 22, 1931 |
| 2,054,380 | Lamb | Sept. 15, 1936 |
| 2,078,363 | Bareiss | Apr. 27, 1937 |
| 2,638,580 | Lovejoy et al. | May 12, 1953 |
| 2,749,447 | Smith | June 5, 1956 |
| 2,764,696 | Hepp | Sept. 25, 1956 |
| 2,866,100 | Leaver | Dec. 23, 1958 |
| 2,967,981 | Wise | Jan. 10, 1961 |
| 3,041,458 | Roxberry | June 26, 1962 |